United States Patent [19]
Armstrong

[11] 3,895,609
[45] July 22, 1975

[54] ROTARY INTERNAL COMBUSTION ENGINE

[76] Inventor: John M. Armstrong, 3814 Greenburg Pk, Pittsburgh, Pa. 15221

[22] Filed: Dec. 21, 1972

[21] Appl. No.: 317,205

Related U.S. Application Data

[63] Continuation-in-part of Ser. No. 280,654, Aug. 14, 1972, abandoned.

[52] U.S. Cl. ............... 123/8.41; 418/61 R; 418/139; 418/240
[51] Int. Cl. ............................................ F02b 53/08
[58] Field of Search ................. 123/8.23, 8.41, 8.45; 418/61 R, 240, 243, 247, 139, 92, 186

[56] References Cited
UNITED STATES PATENTS

| | | | |
|---|---|---|---|
| 516,431 | 3/1894 | Davis | 418/240 |
| 1,061,107 | 5/1913 | Nordmark | 418/247 |
| 1,944,956 | 1/1934 | Thomas | 418/61 R X |
| 1,949,225 | 2/1934 | van Lammeren | 123/8.41 |
| 2,350,005 | 5/1944 | Wilcoxson | 60/39.43 |
| 2,583,633 | 1/1952 | Cronin | 123/8.41 |
| 3,139,722 | 7/1964 | Yokoi | 60/15 |
| 3,314,401 | 4/1967 | Kell | 123/8.45 |

FOREIGN PATENTS OR APPLICATIONS

| | | | |
|---|---|---|---|
| 214,085 | 4/1924 | United Kingdom | 123/8.41 |

*Primary Examiner*—William L. Freeh
*Assistant Examiner*—Michael Koczo, Jr.
*Attorney, Agent, or Firm*—Donn J. Smith

[57] ABSTRACT

A rotary internal combustion engine comprises a housing, a rotor mounted for eccentric rotation within the housing, a separator arrangement engaging the rotor for dividing, in cooperation with the rotor, the housing into at least two chambers. The housing is provided with a number of intake and exhaust ports. A valve member is secured to the rotor for rotation therewith and has a valve opening therein positioned for successive juxtaposition to the housing ports. Optional manifolding and valving arrangements are disclosed.

18 Claims, 24 Drawing Figures

PATENTED JUL 22 1975　　3,895,609

SHEET 4

ROTARY INTERNAL COMBUSTION ENGINE

The present application is a continuation-in-part of my copending application entitled ROTARY INTERNAL COMBUSTION ENGINE filed Aug. 14, 1972, Ser. No. 280,654, and now abandoned.

The present invention relates to rotary internal combustion engines and more particularly to an engine of the character described having unique intake, sealing and/or valving arrangements.

Rotary gas engines have had a long and illustrious history of near-operability. The benefits theoretically obtainable from this type of internal combustion engine have intrigued inventors and engineers alike for many years. The very high rotative speeds (upwards of 10,000 rpm) which appear to be within the ultimate capability of the rotary gasoline engine offer a degree of compactness unattainable with conventional piston type engines. In fact, one well known experimental rotary engine, which may eventuate in commercial feasibility, appears to be capable of delivering the same power output with approximately two-thirds the weight of conventional or piston type internal combustion engine. The possibility exists also that gasoline fuels of lower octane rating can be used.

To realize the full capability of the rotary internal combustion engine, the engine must be capable of operation at very high rpms, usually beyond the capabilities of conventional engines. Operation at these rotative speeds, however, imposes severe demands upon the moving separator or sealing structures, which separate the "firing chambers" of the rotary engine. Serious problems are encountered also in developing a valving system capable of operating accurately at very high repetitive rates. Initially there is the problem of endowing both the sealing or separating arrangement and the valving structures with a high speed repetitive capability and also with the ability of accurately following the eccentricities of the rapidly rotating rotor structure. The extremely rapid rate of wearing in either the valving or the movable sealing arrangements or both has prevented any extensive practical application of rotary internal combustion engines. My present invention is directed to alleviating these problems and to considerably lengthening the anticipated service life of the rotary engine, in an unexpected manner.

Another and usually ancillary problem encountered in the design of rotary internal combustion engines, is the difficulty of supplying highly repetitive and accurately measured quantities of fuel-air mixture to the "combustion chambers" of the rotary engine. This problem is largely solved by the high speed valving arrangement of my invention. However, at extremely high rotative speeds another difficulty arises in supplying small but adequate quantities of the combustion mixture in very rapid succession at required operating pressures. Other features of the invention provide a unique arrangement for pre-compressing or "super charging" the fuel-air mixture.

Previous attempts toward solving one or more of the foregoing problems in rotary engine design are typified, insofar as I am aware, by the U.S. Pat. to Hogguer No. 3,624,740; Ketterer No. 1,996,620; Jacobsen et al No. 3,137,280 and Becher et al No. 3,162,359. None of these patents nor any combination thereof discloses any one or more of my high speed intake, sealing, or valving arrangements. I am also aware of a number of two-stage, rotary pumps or fluid motors suggested in the past and typified by the U.S. Pat. to Jeffries No. 2,245,244; Shore No. 1,715,629; Foxley-Conolly No. 3,361,119 and Johnson No. 2,475,391. These references likewise do not teach or suggest the novel and unexpected structures and solutions proffered by my present invention.

The present invention is directed primarily to alleviating the problems outlined above which in the past have been encountered with respect to rotary internal combustion engines. For example, my invention provides a unique valving system for both intake and exhaust which eliminates the necessity for conventional valving and moving parts separately of the rotor itself. In consequence, the valving arrangement of the invention is capable of a very high repetition rate and is not subject to the wear and malfunction potential engendered by separately moving components. The invention also provides a unique separator or "vane" arrangement wherein little or no bearing forces are developed at the junctions of the sealing means forming part of the separator structure and the rotor surfaces. The separator arrangement, then, is capable of higher operating speeds, and wearing forces are drastically reduced. Also contemplated by the invention are means for precompressing a fuel-air mixture for the rotary engine, as received from conventional carburetion means, and for accurately measuring discrete quantities of the mixture for inletting at the "combustion chambers" of the engine. In this respect the precompressing arrangement is cooperatively associated with certain components of my novel valving arrangement. As in the case of my valving and sealing arrangements, the pre-compressing of the invention are driven in an unexpected manner from the output shaft of my rotary engine.

I accomplish these desirable and unexpected results by providing a rotary internal combustion engine comprising a housing, a rotor mounted for eccentric rotation within said housing, a separator means engaging said rotor for dividing said housing in cooperation with said rotor into at least two chambers, said housing having a number of intake and exhaust ports, and a valve member secured to said rotor for rotation therewith and having a valve opening therein positioned for successive juxtaposition to said housing ports.

I also provide a similar rotary engine wherein said valve member is a generally circular plate secured to a side wall of said rotor, said rotor and said valve plate are secured to a common shaft for rotation therewith, said rotor being located eccentrically on said shaft, said valve plate being located concentrically on said shaft.

I also provide a similar rotary engine wherein said separator means include a pair of separator members slidably mounted in wall channel means of said housing in substantially diametrically opposed relationship.

I also provide a similar rotary engine wherein inward end portions of said separator members are each provided with anti-frictional sealing means for engaging respectively adjacent surfaces of said rotor.

I also provide a similar rotary engine wherein said valve member includes a pair of valve plates secured to opposite sides respectively of said rotor, each of said valve plates having a valve opening therein and engaging a complementarily shaped sidewall structure of said housing, each of said housing wall structures having said intake and exhaust ports therein.

I also provide a similar rotary engine including said rotor being mounted on a shaft extending from said housing and into a second housing, a pump member positioned in said second housing and secured to said shaft for rotation therewith, conduit means for connecting a source of fuel-air mixture to said second housing, and additional conduit means for connecting the output of said second housing to the intake ports of the first-mentioned housing.

I also provide a similar rotary engine wherein cooperative means are coupled to said pump member and to said second housing for pulsing the output of said second housing and said pump member, said pump member and said rotor being secured to said shaft in a phasal relationship such that the output pulses of said second housing are delivered to the intake port means of the first-mentioned housing when said valve member opening is juxtaposed thereto.

I also desirably provide a rotary internal combustion engine comprising a housing, a rotor eccentrically mounted for rotation within said housing, separator means for dividing said housing in cooperation with said rotor into at least two chambers, said housing having intake and exhaust ports for each of said chambers, said separator means including a pair of separator members positioned for opposed substantially diametric engagement with said rotor and slidably mounted in respective wall structures of said housing, outward end portions of said separator members extending outwardly of said housing and joined to a yoke structure, said rotor being eccentrically mounted on an output shaft rotatably mounted on said housing, and eccentric means mounted on said shaft in engagement with said yoke structure for reciprocation thereof, said eccentric means having an angular phasal relationship with said rotor such that said separator members are reciprocated in substantially non-bearing contact with said rotor.

I also desirably provide a similar rotary engine wherein inward faces of said separator members are each provided with anti-frictional sealing means for contacting said rotor, said sealing means spanning geometric and eccentric centers of said rotor in a direction transverse to that of the sliding movement of said separator members.

I also desirably provide a rotary pump for delivering a pulsating flow, said pump comprising a housing, a rotor eccentrically mounted for rotation within said housing, separator means mounted on said housing for engagement with said rotor for dividing said housing into at least two chambers in cooperation with said rotor, said housing having inlet and outlet ports for each of said chambers, a valve member mounted on said rotor for rotation therewith, said valve member having inlet and outlet openings positioned thereon for engagement respectively with said housing inlet and outlet ports.

I also desirably provide a similar rotary engine wherein said first and said second casings are compartments in a common engine housing, said housing having a partition therethrough and separating said casings.

I also desirably provide a similar rotary engine wherein said housing partition includes at least two transfer ports positioned for successive juxtaposition thereto by said valve member opening.

I also desirably provide a similar rotary engine wherein said pump member is provided with a valve member having an outlet valving port therein positioned for successive juxtaposition to said transfer ports.

During the foregoing discussion, various objects, features and advantages of the invention have been set forth. These and other objects, features and advantages of the invention together with structural details thereof will be elaborated upon during the forthcoming description of certainly presently preferred embodiments of the invention and presently preferred methods of practicing the same.

In the accompanying drawings I have shown certain presently preferred embodiments of the invention and have illustrated certain presently preferred methods of practicing the same, wherein.

Figure 1:
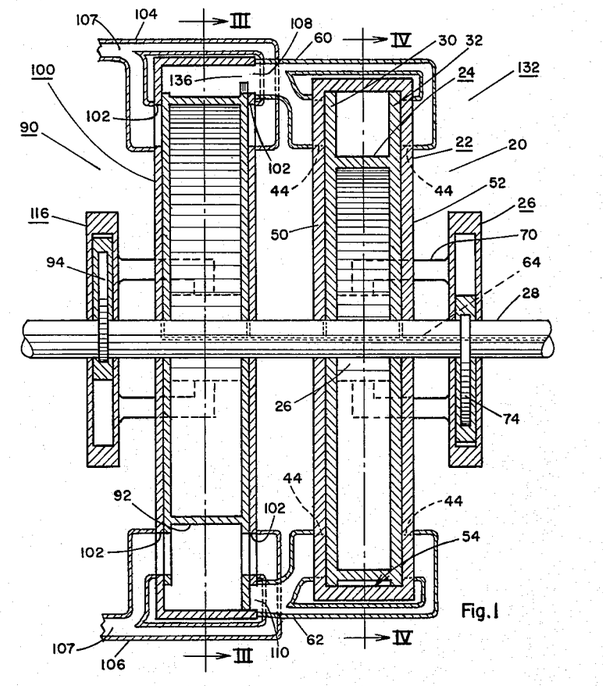
FIG. 1 is a sectional view taken generally along reference line I—I of FIG. 3 of one arrangement of a rotary internal combustion engine according to my invention.

Referring now more particularly to the drawings my rotary engine 20 includes essentially an output housing or casing 22, eccentric rotor 24, separator mechanism 26, and output shaft 28, to which the output rotor 24 and accompanying valve plates 30, 32 are affixed for rotation therewith (FIGS. 1, 2, 2A, 4). As better shown in FIG. 4 the separator mechanism 26 includes primarily a pair of separator members 34, 36 each of which is provided with unique anti-frictional and lubricational means to endow the separator mechanism 26 with a long wearing characteristic, as described in more detail below. The separator members 34, 36 divide the annular space, which varies in radial width owing to the eccentricity of the rotor 24 about its geometric center 38, into two compartments or "combustion chambers" 40, 42. A fuel-air mixture is inducted into these chambers, through intake ports 44, where the fuel-air mixture is ignited alternately and successively by a pair of spark plugs 46. The spark plugs are connected to a conventional, high-voltage electrical distribution system (not shown) which can be mechanically coupled to output shaft 28. For adequate supply of the fuel-air mixture an intake port 44, for each of the combustion chambers 40, 42 is located on each side of the output housing 22 (FIG. 1). Two such ports are thus provided for each chamber 40 or 42.

As the fuel-air mixture is ignited in each combustion chamber 40 or 42, the rotor 24 is driven in the clockwise direction (as viewed in FIG. 4) as denoted by arrow 48. For example, assuming that the fuel-air mixture compressed in the chamber 42 has just been ignited, the point A of actual or near contact between the radial surfaces of the eccentric rotor 24 and the housing or casing 22 will be driven to the left (FIG. 4) or in the clockwise rotational direction.

A unique feature of my rotary engine 20 is the elimination of discrete or discretely movable valve components. In furtherance of this purpose, the sidewalls of the eccentric rotor 24 are extended to form the aforementioned valve plates 30, 32 which, of course, rotate with the output shaft 28 and rotor 24. The valve plates 30, 32, however, are closely fitted against complementarily shaped side walls 50, 52 respectively of the output housing or casing 22, while their radial edges or outer peripherases are likewise fitted closely against inner radial wall surface 54 of the output housing (FIG. 1).

Figure 4:
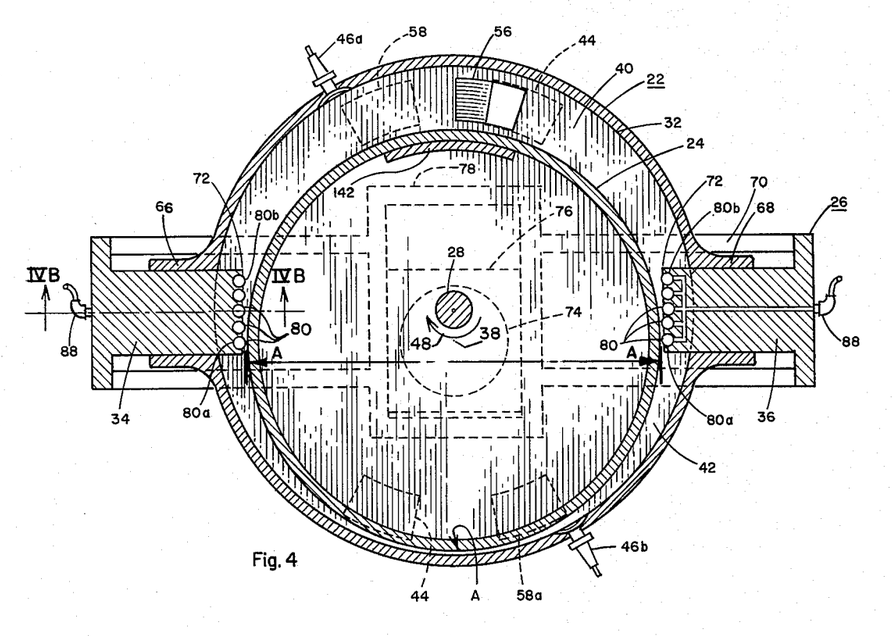
FIG. 4 is a similar view of the output rotor and housing of FIG. 1 and taken along reference line IV—IV thereof.
Figure 4A:
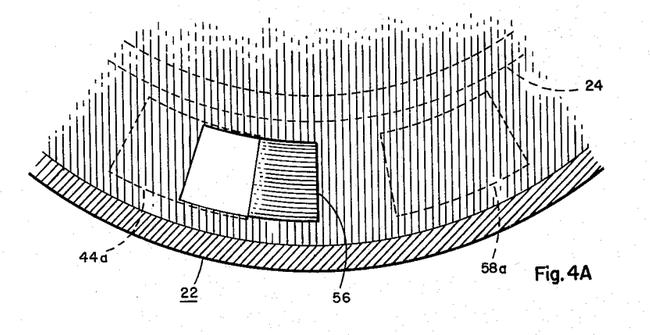
FIG. 4A is an enlarged partial, sectional view of the engine as shown in FIG. 4 but showing the output rotor displaced approximately one-half revolution from that shown in FIG. 4.

Each of the valve plates 30, 32 is provided with a valve port or opening 56 (FIGS. 2A, 4) which is successively juxtaposed to exhaust ports 58 in the sidewalls 50, 52 of the output rotor housing 22 and to the aforementioned intake ports 44, similarly located. Thus, the exhaust gases generated by the aforementioned ignition of the fuel-air mixture in the combustion chamber 42 are exhausted when the valve ports 56 of the valve plates 30, 32 reach the exhaust ports 58a of the housing 22 (one of which exhaust ports is shown in FIG. 4A) upon further rotation of the rotor 24 and valve plates 30, 32. The housing 22 is divided into chambers 40, 42 by the separator members 34, 36, in cooperation with the rotor 24 as noted above and described more fully below.

Further movement of the rotor 24 juxtaposes the valve ports 56 of its valve plates 30, 32 to the intake ports 44a (FIG. 4A) of the output housing 22 preparatory to the succeeding induction, and subsequent compression and ignition of the fuel-air charge. In the meantime a similar progression of events is taking place in the upper combustion chamber 40, but substantially 180° out of phase with the events in the lower combustion chamber 42. A suitable source of carbureted fuel-air mixture is coupled to the intake ports 44 for example through intake manifold 60, 62 (FIG. 1). The surface engagements between the valve plates 30, 32 and the adjacent surfaces of the housing 22 can be lubricated through a branched duct system 64 extending through the output shaft 28 and short distances radially of the valve plates. Lubricant can be supplied to the passages 64 through a suitable rotating seal (not shown) coupled to one end of the output shaft 28.

Turning now to the separator mechanism 26 of the invention as associated with the output housing or casing section 22 and rotor 24, the two separator members 34, 36 are each slidably mounted in housing ports or channel means 66, 68 (FIG. 4) therefor in the output housing section 22. These outward ends are connected to a transverse yoke structure 70 such that the separator members 34, 36 are always positioned the same distance apart with respect to one another. Thus, each transverse movement of the separator 34 toward or away from the output shaft 28 is necessarily counterbalanced by an exactly equal and complementary movement of the other separator 36, in following the radial surfaces of the rotor 24. The sealing means denoted generally at reference numerals 72 and associated respectively with the separators 34, 36 are arranged such that opposing portions thereof are always contacted by the full diametric dimension AA of the eccentric rotor 24 as noted below, and as shown in FIG. 4.

Means are provided for driving the yoke structure 70 and separator members 34, 36 from the output shaft of the rotary engine 20. By independently driving the separator members 34, 36, the separator mechanism 26 is not dependent upon bearing contact with juxtaposed surfaces of the rotor 24 for its operation. Although the sealing means 72 of the separators 34, 36 remain in continuous contact with the surface of the rotor 24 there is little or no bearing engagement. Wearing of the separator members 34, 36 at their vital sealing means and points of contact with the rotor 24 is virtually eliminated.

The yoke structure 70 is actuated from one of the output shaft eccentrics i.e. eccentric 74 (FIGS. 1, 2 and 4) and by slide 76 (to absorb the vertical motion component, as viewed in FIG. 4) which reciprocates within frame 78 forming part of the yoke structure 70. The shaft eccentric 74, which is secured to the output shaft 28 for rotation therewith, is oriented relative to the rotor 24 and to the slide 76 and components of the yoke structure 70 such that the separator members 34, 36 are always in essentially non-bearing contact or engagement with the juxtaposed surfaces of the rotor 24. That is to say, the engagement is fluid-tight to prevent passage of liquid or gaseous materials, but there is no variation in contact pressure as the rotor 24 revolves.

Figures 4B, 4C, 4D:
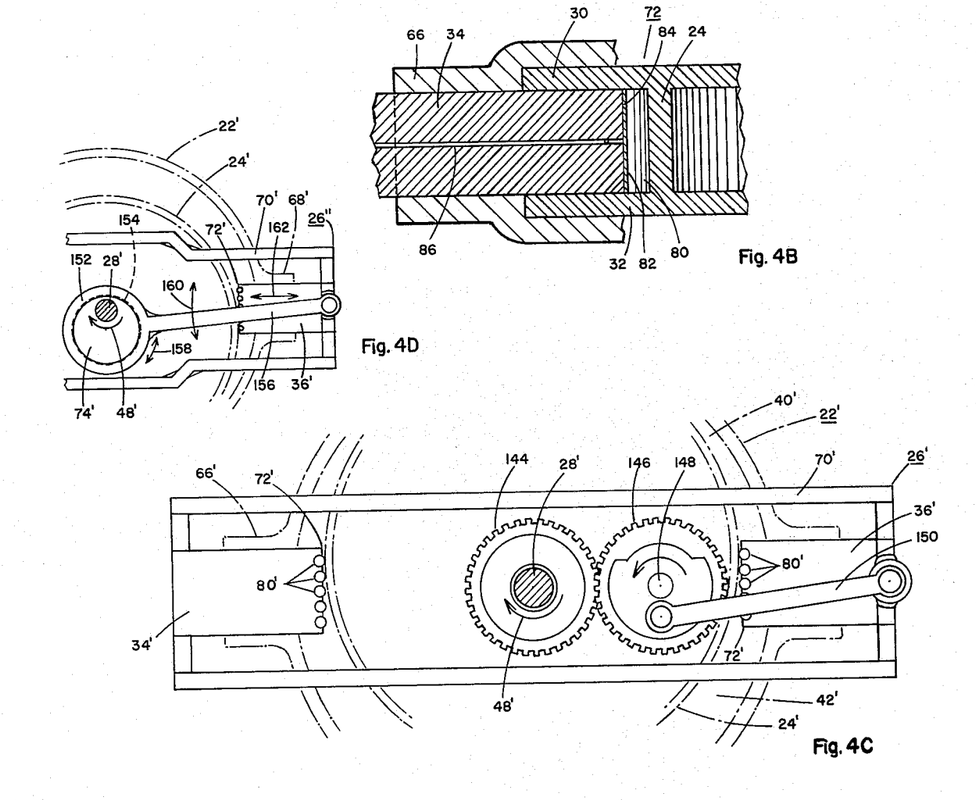
FIG. 4B is an enlarged, partial, longitudinally sectioned view of one of the separator and sealing members as shown in FIG. 4 and taken along reference line IVB—IVB of FIG. 4.
FIG. 4C is a partial view, similar to FIG. 4 but showing a modified form of the separator mechanism.
FIG. 4D is a partial view, similar to FIG. 4C, but showing still another form of the separator mechanism.

One arrangement of the aforementioned sealing means 72 includes a series of roller bearings 80 (FIG. 4) which are partially encapsulated in the inward faces of the separator members 34, 36, as better shown in FIG. 4B. Each of the roller bearings 80 is partially encapsulated and rotationally entrapped in a cylindrical recess 82 or the like formed in the inward face of the associated separator 34 or 36. If desired the recess 82 can be lined or sleeved with a hardened bearing material 84 such as stellite. The roller bearings 80 are each co-extensive in length with the width of the rotor 24 i.e. the distance between the valve plates 30, 32 thereof which retain or longitudinally entrap the bearings 80 in position. The bearings 80 of the sealing means 72 can be readily inserted and withdrawn upon removal of the separator members 34, 36 from the housing 22 by withdrawing the bearings 80 transversely of the open ended passages 82 therefor in the separator members 34, 36. The bearings 80 thus provide a rolling contact between the sealing means 72 of the separator members 34, 36 and the outer arcuate surfaces of the eccentric rotor 24 to further reduce wearing at the contact areas between the separators 34, 36 and the rotor 24.

As shown in FIGS. 4, 4B a unique lubricational system is provided by the invention not only for the roller bearings 80 but for the engaging surfaces of the separator members 34, 36, the ends of the bearings 80 the housing ports 66, 68 and the adjacent surfaces of the valve plates 30, 32. One arrangement arrangement for such lubrication includes a longitudinal passage and branched conduit system 86 extending substantially through each of the separator members 34, 36 and through each of the liners 84, if used, to the recesses 82. If desired the recesses 82 can be further provided with lubricational grooves, (not shown). The branched conduit systems 86 can be coupled to suitable flexible conduits 88 (FIG. 4) and thence to a source of suitable lubricant (not shown).

It will be understood that a different number of roller bearings 80 than that illustrated can be employed as long as two or more such bearings are employed for each of the separator members 34, 36. As evident from FIG. 4 when the geometric center 38 of the rotor 24 is in its lowermost position the lowest roller bearing 80a (viewed in FIG. 4) of each sealing means 72 are separated precisely by the full diametric dimension of the rotor 24. On the other hand when the rotor 24 is angularly displaced 180° from the position shown in FIG. 4 the geometric center 38 thereof then in its uppermost position (not shown). At that instant the uppermost roller bearings 80b of each sealing means 72 engage the rotor 24 at its full diametric dimension. For angular displacements of the rotor between these positions an intermediate one or ones of the roller bearings 80 are similarly engaged. Thus, the inward ends of the separators 34, 36 always span the full diametric dimension of the rotor 24, in the longitudinal direction of the separators, while each of their sealing means 72 spans in a transverse direction of the separators the eccentric and geometric centers of the rotor 24.

As noted previously the intake manifolds 60, 62 of the output housing 22 can be coupled directly to a carburetion system or other source of a suitable fuel-air mixture for ignition within the rotary engine 20. However, for a more efficient operation of the rotary engine 20, particularly at higher rpms, it is desirable to provide a supercharging or precompression of the fuel-air mixture before inletting to the manifolds 60, 62, and the combustion chambers 40, 42. However, using a simple blower or the ram effect of a moving vehicle or the like is not appropriate for this purpose inasmuch as proper operation of the rotary engine 20, as in the case of most internal combustion engines, requires a precisely timed inletting of discrete quantities of fuel-air mixture. A pulsed supercharged inletting, in the case of a rotary internal combustion engine, is rendered even more difficult of attainment owing to the high rotative speeds thereof.

One such pumping or precompression arrangement for successfully compressing and pulsing the fuel-air mixture of a rotary combustion engine, and for significantly increasing the efficiency of the rotary engine 20 is illustrated in FIGS. 1, 2, 2B and 3. The precompression stage 90 includes in this example a pump member such as eccentric rotor 92 and a separator eccentric 94, both of which are secured to output shaft 28 for rotation therewith. The intake rotor 92 includes valve plates 96, 98 forming part thereof but concentrically mounted relative to the shaft 28. The intake rotor 92 and associated components are rotatably mounted within intake housing or casing 100 which is provided in this example with four intake ports 102 and a pair of intake manifolds 104, 106. The intake housing manifolds 104, 106 can be coupled to a suitable carburetion system or other source of air-fuel mixture through conduit sections 107 thereof.

The intake or compression housing 100 is further provided with a pair of outlet ports 108, 110 disposed on a side of the intake housing adjacent the output housing 22 as evident from FIG. 1. The outlet ports 108, 110 are further disposed in housing extensions 112, 114 (FIG. 3), which are positioned substantially diametrically at the periphery of the intake housing or casing 100 and coupled respectively to the aforementioned intake manifolds 60, 62 of the output housing 22.

Figure 2:
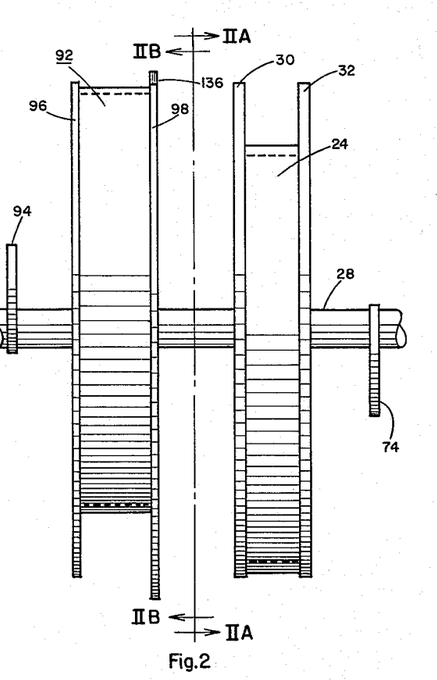
FIG. 2 is an elevational view of the rotor and eccentric structures shown in FIG. 1.
Figure 2A:
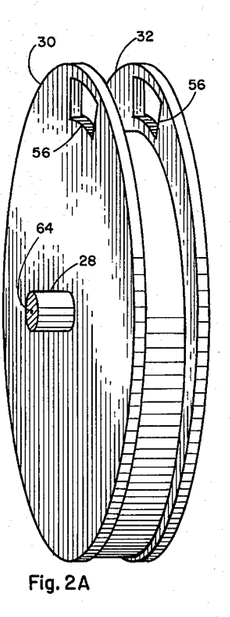
FIG. 2A is an isometric view of the output rotor and valve plate structure shown in FIG. 2 and viewed generally from reference plane IIA—IIA thereof.
Figure 2B:
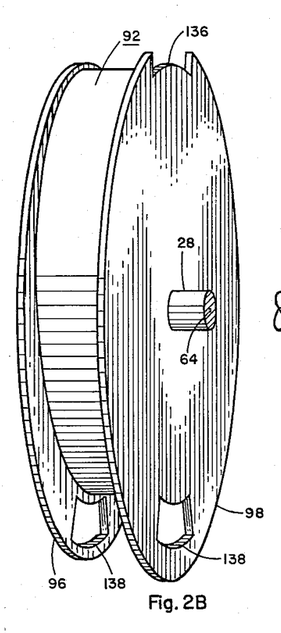
FIG. 2B is an isometric view of the intake rotor and valve plate structure shown in FIG. 2 and viewed generally from reference plane IIB—IIB thereof.

The eccentricity of the compression rotor 92 together with its engagement with separator mechanism 116 (FIG. 3) provides two compression or pumping chambers 118, 120 of variable volumetric capacity within the intake housing 100. The separator mechanism 116 including separator members 122, 124, yoke structure 126 and sealing means 128 is similar in structure and operation to the separator mechanism 26 of the output housing 22 described previously. The separator mechanism 116 of the intake housing or casing 100, however, is driven in timed or phasal relation with the intake rotor 92 by means of the aforementioned output shaft eccentric 94 (FIGS. 1 and 2). Desirably the roller bearings of the sealing means 128 bear the same geometric relationship to the geometric center 130 of the intake rotor 94 as set forth previously in connection with center 38 of the output rotor 24 and the sealing means 72 of FIG. 4.

The precompression stage 90, forming in this example part of the rotary internal combustion engine 20, acts as a positive displacement pump the input power for which is furnished directly by the output shaft 28 and ultimately by the output or combustion stage 132 of the rotary engine 20. As the compression rotor 92 is angularly displaced (arrow 134) each chamber 118, 120 "expands" and "contracts" for air fuel intake, compression and expulsion. These functions are carefully controlled and timed with respect to the combustion stage 132 of the rotary engine 20 by means of the aforementioned valve plates 96, 98 forming part of the rotor 92, and by the phasal relation between the intake rotor 94 and the output rotor 24 on shaft 28.

Figure 3:
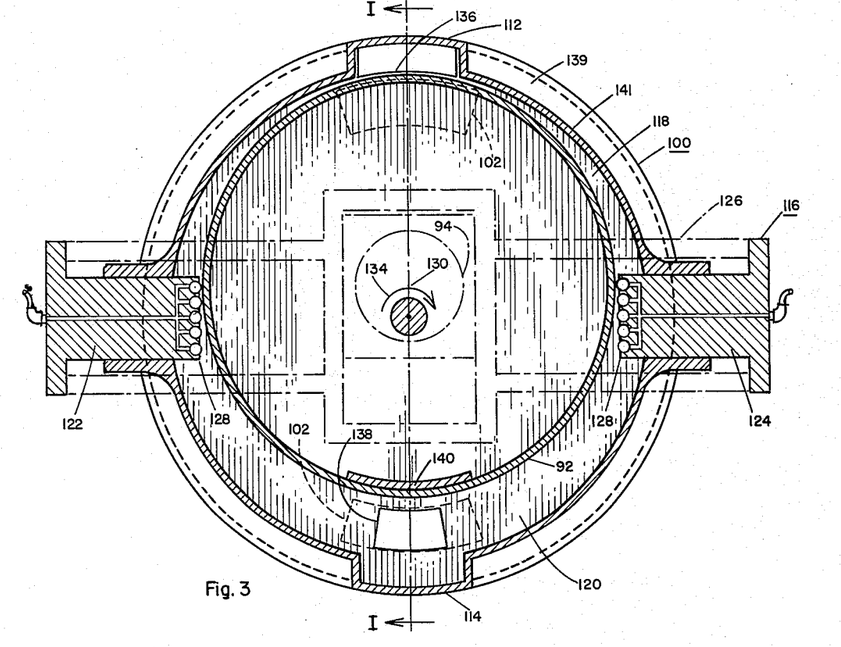
FIG. 3 is a cross sectional view of the intake rotor and housing of FIG. 1 and taken along reference line III—III thereof.

At the particular angular displacement of the rotor 92 relative to the compressor or pump housing or casing 100 shown in FIG. 3, the compressor chamber 118 as defined by the adjacent housing and rotor surfaces and by the separators 122, 124 is at or near its maximum compression configuration. At this time the air-fuel mixture which has been compressed by contraction of the chamber 118 is being forced into compressor housing extension 112 and thence through notch 136 in valve plate 98 (FIGS. 2B and 3) and into the upper intake manifold 60 of the output housing 22.

Owing to the use of the discharge controlling notch 136, the valve plate 98 in this example is of larger diameter than the valve plate 96 of the rotor 92. Therefore, as evident from FIG. 3 the compressor housing or casing section 100 is provided with a peripheral lip 139 into which the outer periphery of the valve plate 98 is seated. The remainder of the housing periphery is stepped down as denoted by reference character 141 (except at the housing extensions 112, 114 which communicate with the lip structure 139) such that the outer periphery of the smaller valve plate 96 of the rotor 92 is closely fitted against the inner arcuate wall surface of the housing or casing 100, save for operating clearances.

From the manifold 60 the precompressed fuel-air mixture enters the expanded combustion chamber 40 of the output housing 22 via housing intake ports 44 and valve plate ports 56 of the rotor 24. The air-fuel mixture is then further compressed by contraction of the upper chamber 40 (as viewed in FIG. 4) prior to subsequent ignition by spark plug 46a. The notch 136 in valve plate 98 of the rotor 92 is situated thus with respect to the valve ports 56 of the rotor 22 such that the notch 136 is juxtaposed to the upper compressor housing extension 112 during the interval that the valve plate ports 56 are juxtaposed to the intake port 44 of the output housing 22. In this arrangement, the compressor state 90 supplies a precisely measured and timed, discretely pulsed quantity of air-fuel mixture to the compression chamber 40, when the latter is in its intake mode. When the rotor 92 is displaced approximately one-half turn from its angular position shown in FIG. 3 the notch 136 performs essentially the same function with respect to the lower compression chamber 120, lower housing extension 114 of the compressor housing 100, and intake manifold 62 of the output housing 22.

The intake mode of the compressor chambers 118, 120 is illustrated in FIG. 3 by the lower compressor chamber 120. Prior to juxtaposition of intake valve ports 138 (FIGS. 2B, 3) of the rotor valve plates 96, 98 to the lower intake housing ports 102 respectively, the lower compressor chamber 120 is developing an increasingly negative pressure (relative to atmospheric pressure) owing to expansion of the chamber 120 and the presence of the sealing arrangements 128, close tolerances, lubricational films, and the like. The length of the compressor housing intake ports 102 is such that the pressure within the expanded compressor chamber 120 essentially equalizes although the valve ports 138 of the compressor rotor 92 sweep past the intake ports 102 at extremely high rotative speeds. Compression of the air-fuel charge thus inducted into the chamber 120 commences as the right hand ends of the rotor valve ports 138 leave the left hand ends of the compressor housing lower intake ports 102. Compression continues until the outlet notch 136 of the compressor rotor valve plate 98 becomes juxtaposed to the lower compressor plate 98 lower compressor housing extension 114 about one-half revolution later. At that time the intake valve ports 138 perform essentially the same intake function with respect to the compressor housing upper intake ports 102 and manifold 104 (FIG. 1).

In operation, then, of the rotary internal combustion engine 20, air-fuel mixture is drawn initially and alternately through conduits 107 of compressor intake manifolds 104, 106, compressed preliminarily in compression chambers 118, 120 (FIG. 3) and then discharged in precisely timed or pulsed relationship to the combustion intake manifolds 60, 62. From these manifolds the precompressed fuel-air mixtures are drawn alternately into the combustion chambers 40, 42 (FIG. 4) of the combustion stage 132 of the rotary engine 20. After successive ignition in these combustion chambers, the exhaust gases are alternately discharged through combustion housing exhaust ports 58 and thence through suitable exhaust ducts (not shown).

In furtherance of the desired phasal relationship between the compression chambers 118, 120 of the compressor stage 90 and the combustion chambers 40, 42 of the combustion stage 132 of the rotary engine 20, it will be seen from FIGS. 1, 2 that the compression rotor assembly 92 is displaced approximately one-half turn from the combustion rotor assembly 24. The eccentricity of the compression rotor 92, therefore, tends to statically balance the eccentricity (weight-wise) of the combustion rotor 24. However, for a more adequate dynamic balance it is desirable to provide weights 140 (FIG. 3) and 142 (FIG. 4) on the small radii respectively of the rotors 92, 94.

In FIG. 4C, where similar reference characters with primed accents denote similar components of FIG. 4 and related figures, an alternative structure of the separating mechanism 26' is shown. The separator members 34', 36' which are joined through yoke 70' to maintain a precise separation as aforesaid, are provided with alternative means for reciprocation thereof from the output shaft 28'. In this arrangement a gear 144 is secured to the output shaft 28' for rotation therewith, generally in place of the shaft eccentric 74 (FIGS. 1 and 2) described above. A second gear 146, enmeshed with the first-mentioned gear 144, is rotatably mounted on stub shaft 148 affixed to the adjacent side of combustion housing 22'. The yoke structure 70' and the separator members 34', 36' are driven from the second gear 146 by means of a crank arrangement. This arrangement includes crank lever 150, which is pivoted adjacent its ends to the yoke structure 70' and to the second gear 146, respectively. The gear shaft 148 terminates adjacent the side surface of the associated gear 146, and thus does not interfere with the crank lever 150, which is pivoted eccentrically to the gear 146. The eccentric pivot of the lever 150 is positioned on the gear 146 in angular phasal relationship to the eccentricity of the rotor 24' such that the separator members 34', 36' are always maintained in contact of their end portions 72' with the adjacent arcuate surfaces of the rotor 24'. In furtherance of this purpose the gears 144, 146 preferably are in one to one ratio.

Another arrangement of my novel separator mechanism 26' is illustrated in FIG. 4D. The overall structure of the separator members including the member 36', and the yoke 70' is generally similar to that illustrated in FIGS. 3, 4, 4C and related figures. FIG. 4D however presents a modified form of the reciprocatory means for the separator structure 26" and coupled between the yoke structure 70' and the output shaft 28'. In this arrangement the reciprocatory means include a sleeve type bearing 152 which is fitted over the shaft eccentric 74' described previously. The inner periphery of the bearing sleeve 152 desirably is recessed at 154 for engagement with the outer periphery of the shaft eccentric 74' in order to retain the bearing sleeve 152 on the shaft eccentric. Recessing of the bearing sleeve 152 as illustrated can be accomplished by facricating the sleeve 152 from two or more components, in an obvious manner. The eccentric 74' rotates within the sleeve 152 while the latter remains relatively motionless insofar as rotation is concerned.

A crank arm 156 extends from the bearing sleeve 152 and is pivoted at its outer end to the yoke structure 70' (or to the adjacent one of the separators for example the separator member 36').

As the shaft eccentric 74' is rotated, by operation of the rotary engine 20', the vertical motion component of the eccentric 74' is absorbed by slight relative turning (arrow 158) of the bearing sleeve 152 and by swinging (arrow 160) of the adjacent end of the crank arm 156. On the other hand, the horizontal motion component (as viewed in FIG. 4D) of the shaft eccentric 74' is translated directly into longitudinal movement (arrow 162) of the crank arm 156. These movements are in turn transferred directly to the yoke structure 70' and to the separator members rigidly joined thereto. Accordingly, the inward end portions 72' of the separator members are always maintained in substantially non-bearing contact with the adjacent arcuate surfaces of the output rotor 24'.

It will be understood of course that either the separator mechanism 26' of FIG. 4C or the mechanism 26" of FIG. 4D can be substituted for the separator mechanism 116 shown in FIG. 3 and related figures.

With reference now to FIGS. 5–11 of the drawings, where similar reference characters with doubly primed accents denote similar components of the preceding figures, another arrangement of my novel rotary internal combustion engine 20" is shown therein. The rotary engine 20" includes a compartmented housing 164 having a generally central partition wall 166 therein to define a first housing compartment 168 in which is rotatably mounted an eccentric output rotor 24", and a second housing compartment 170 in which is rotatably mounted an eccentric intake rotor 172. Each housing compartment 168 or 170 is subdivided into combustion chambers after the manner described previously by a separator mechanism 26" or 116" respectively. As the output shaft 28" is turned by output rotor 24" the separator mechanisms 26", 116" are actuated as described previously by eccentrics 74" and 94" respectively, which are also affixed to the shaft 28" for rotation therewith.

Figures 5, 8B:
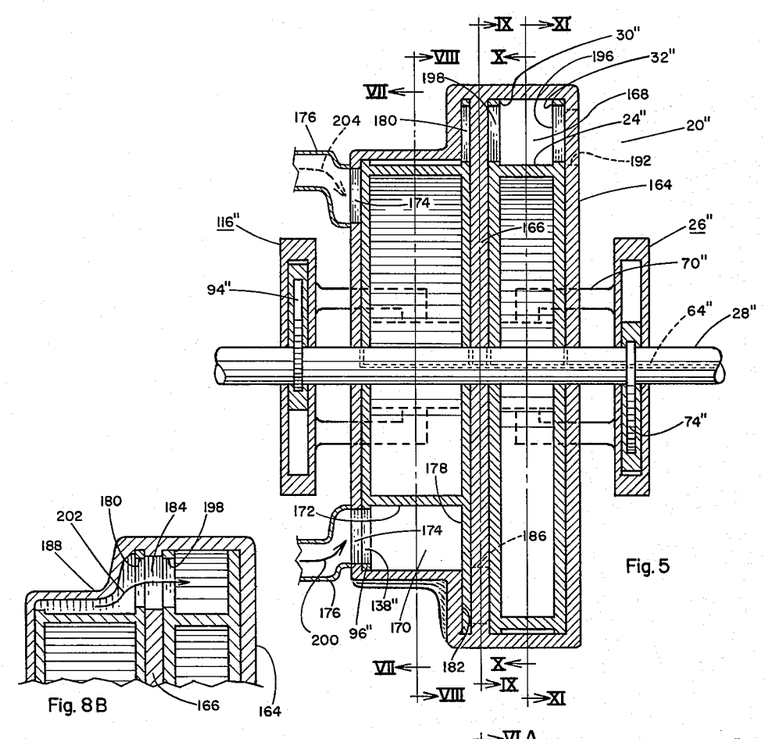
FIG. 5 is a view similar to FIG. 1 but showing another arrangement of the rotary internal combustion engine of the invention.
FIG. 8B is a similar view showing the operative positions of certain components of the rotary engine at an angular or rotative position thereof immediately following that shown in FIG. 8A.
Figures 7, 8, 8A, 9, 10, 11:
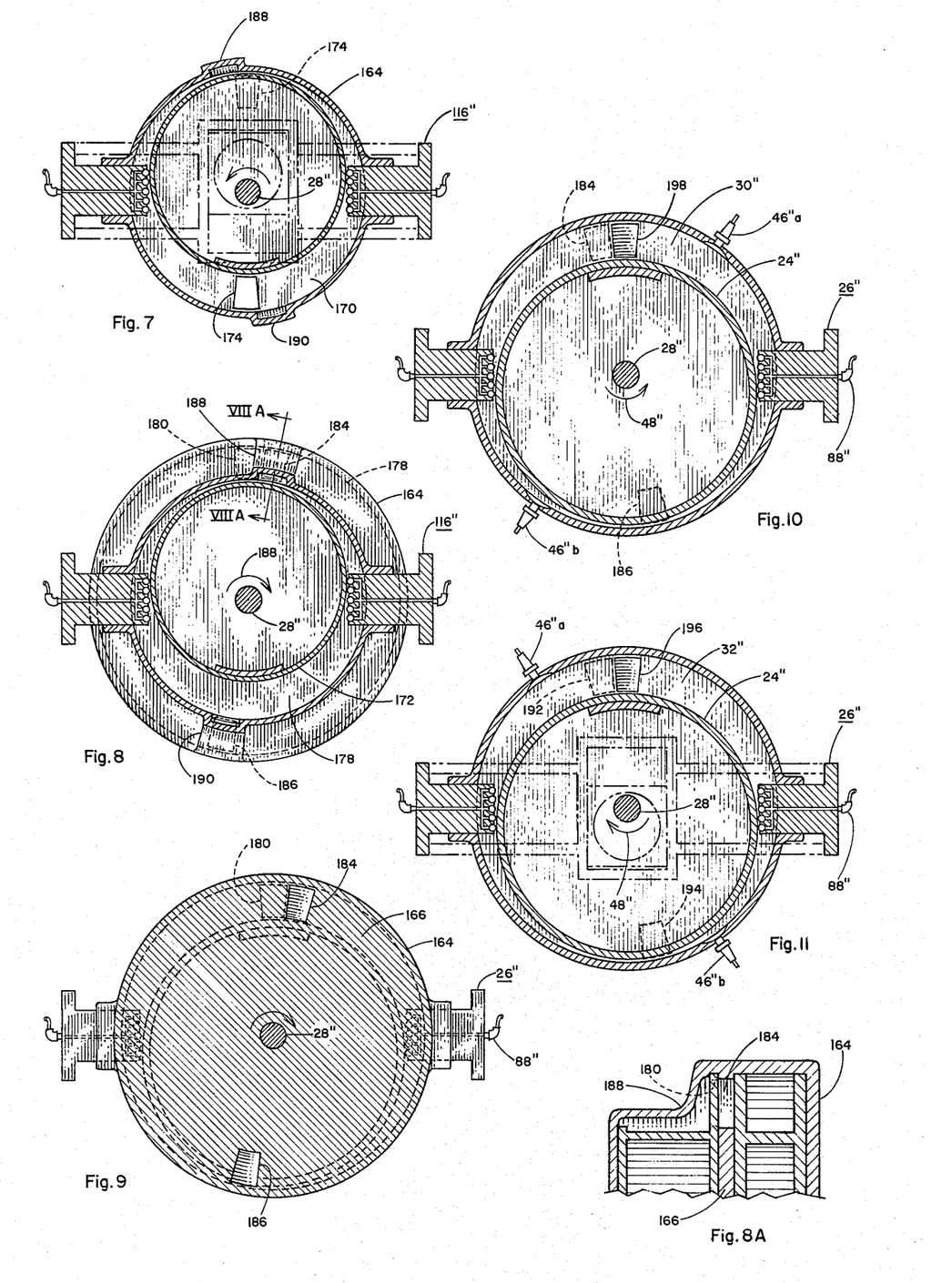
FIG. 7 is a cross sectional view of the intake rotor and adjacent housing structure shown in FIG. 5 and taken along reference line VII—VII thereof.
FIG. 8 is a similar view taken from reference line VIII—VIII of FIG. 5.
FIG. 8A is a partial, longitudinally sectioned view of the rotary combustion engine as shown in FIG. 8 and taken along reference line VIIIA—VIIIA thereof.
FIG. 9 is another cross sectional view of the engine as shown in FIG. 5 and taken from reference line IX—IX thereof.
FIG. 10 is a cross sectional view of the output rotor and adjacent housing structure of FIG. 5 and taken along reference line X—X thereof.
FIG. 11 is a similar view taken from reference line XI—XI of FIG. 5.

The housing 164 includes a pair of inlet ports 174, as better shown in FIGS. 5 and 7, which communicate with the housing compartment 170. A fuel-air mixture is conducted to the inlet ports 174 through a suitable manifold or other conduit means represented generally by the reference numerals 176. The manifold or manifolds 176 can be supplied from a suitable carbureting device (not shown). Cooperating with the intake ports 174 is a valving aperture 138" in valve plate 96" forming part of the rotor 172. As described previously the upper and lower portions of the housing compartment 170 become alternately intake and compression chambers as the eccentric intake or compression rotor 172 rotates with the shaft 28".

Figure 6:
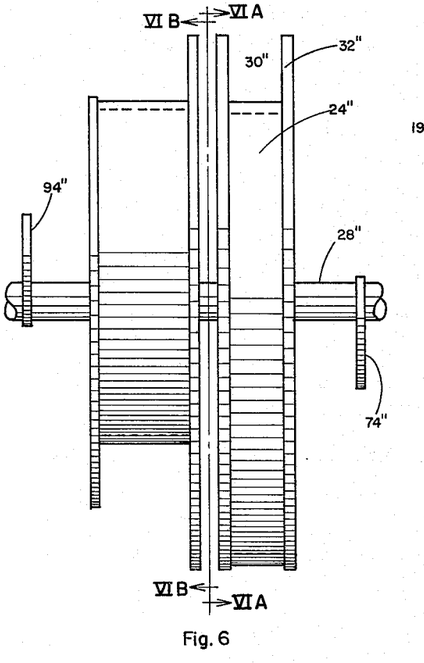
FIG. 6 is an elevational view of the rotor and eccentric structures shown in FIG. 5.
Figure 6A:
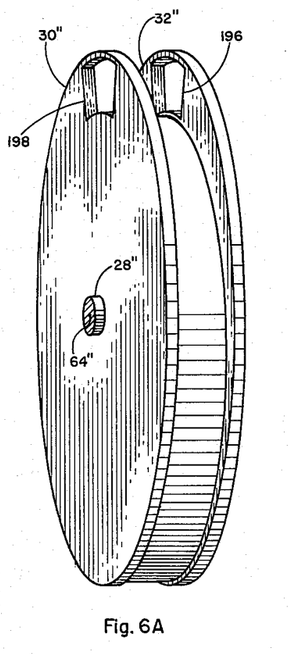
FIG. 6A is an isometric view of the output rotor and valve plate structures shown in FIG. 6 and viewed generally from reference plane VIA—VIA thereof.
Figure 6B:
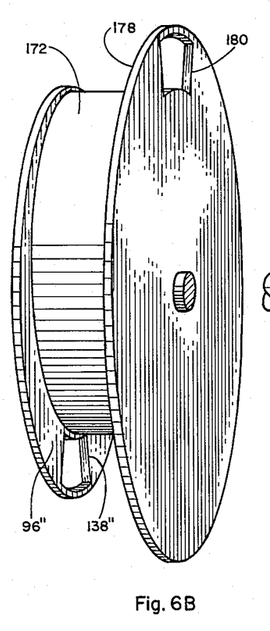
FIG. 6B is an isometric view of the intake or compression rotor and valve plate structures shown in FIG. 6 and viewed generally from reference plane VIB—VIB thereof.

Also affixed to the rotor 172 is a second valve plate 178 having a valving aperture 180 therein (FIGS. 5, 6B and 8). The aperture 180 is for outlet valving purposes and, where the housing compartment 170 is divided into two compression chambers, is displaced approximately 180° from the inlet valving aperture 138" in the valve plate 96", as better shown in FIG. 6B. The valve plate 178 is pheripherally seated (FIGS. 5 and 8) in a relatively deep, inner circumferential groove 182 communicating with the housing compartment 170. The groove 182 and valve plate 178 are thus disposed close to and desirably flushly against the central housing partition 166.

The housing partition is provided with a pair of transfer ports 184, 186 which are diametrically opposed and positioned adjacent the uppermost and lowermost portions of the housing 164, as better shown in FIG. 8. Thus, immediately after the intake rotor 172 reaches the point of maximum compression in either of the compression chambers of the housing compartment 170, the outlet valving aperture 180 of the valve plate 178 is juxtaposed to an associated one of the transfer ports 184, 186 (FIGS. 8, 8A). Thus, in FIG. 8, assuming rotation of the rotor 172 in the direction denoted by arrow 188, the outlet valving port 180 of the intake rotor 172 will shortly become juxtaposed to the upper transfer port 184. Similarly, the valving port 180 will become juxtaposed with the lower transfer port 186 immediately following maximum compression within the lower compression chamber of the housing compartment 178.

As evident from FIGS. 7, 8, and 8A, the housing 164 is provided with a hollow protuberance 188 or 190 positioned to communicate with the associated transfer port 184 or 186 (FIG. 9) but only when the valve plate outlet aperture 180 is juxtaposed thereto. At other times the pheripheral portions of the valve plate 178 seated within the groove 182 prevent flow of fluid between the housing compartments 168, 170 through the transfer ports 184, 186 except when the valve plate aperture 180 of the intake rotor 172 is juxtaposed to one of these transfer ports.

As explained previously the intake rotor 172 is displaced approximately 180° from the eccentricity of the rotor 24" so that the corresponding chambers communicating with each of the housing transfer ports are under compression and "suction" respectively. Thus, when the upper portion of the housing compartment 170 is under compression as shown in FIG. 5 the upper portion of the housing compartment 168 is under "suction" or completely expanded. This arrangement of course, facilitates the transfer of the compressed fuel-air mixture from the upper intake chamber through the transfer port 184 and into the upper output chamber. A similar relationship occurs with the bottom portions of the housing compartments 170, 168 when the rotors have been rotated about 180° from their positions as shown in FIG. 5.

After the compressed fuel mixture is thus inducted alternately through the upper and lower transfer ports 184, 186 (FIGS. 9 and 10) the fuel mixtures are combusted alternately in the upper and lower chambers respectively of the output compartment 168 by operation of spark plugs 46"a and 46"b (FIGS. 10 and 11). The output rotor 24" then is driven in the rotational direction denoted by arrow 48". The products of combustion are eliminated alternately from the upper and lower portions of the output compartment 168 through the respectively associated exhaust ports 192, 194 formed in the adjacent sidewall of the engine housing 164, as better shown in FIGS. 5 and 11. Cooperating with the exhaust ports 192, 194 is an outlet valving aperture 196 formed in the valve plate 32" of the rotor 24". From FIG. 11 it will be evident that the outlet valving aperture 196 has just passed a position of coincidence with the upper exhaust port 192 in the engine housing 164 to exhaust the upper combustion chamber of the output housing compartment 168. Assuming that the lower spark plug 46"b fires in the position of the rotor 24" shown in FIG. 11 the rotor 24" will be subjected to a "power stroke" of almost 180° revolution until outlet valving aperture 196 of its valve plate 32" coincides with the lower housing exhaust port 194 to exhaust the lower combustion chamber of the housing compartment 168.

From FIGS. 5, 6A, and 10 it will be evident that the output rotor 24" is provided with a second or intake valving aperture 198 in its valve plate 30". The inlet valving aperture 198 cooperates alternately with the transfer ports 184, 186 in the housing partition 166 mentioned previously for the alternate induction of fuel-air mixtures into the upper and lower combustion chambers respectively of the output compartment 168. With reference to the upper of such combustion chambers and from a comparison of FIGS. 10 and 11, it will be seen that at a position an instant following exhaust of the upper chamber (FIG. 11) through the upper exhaust port 192 as described above, the intake valving aperture 198 of the rotor 24" will coincide with the upper transfer port 184 (FIG. 10) to induct a fresh charge of compressed fuel-air mixture into the upper combustion chamber of the housing compartment 168 directly from the upper compression chamber of the housing compartment 170 (FIG. 8A). From FIGS. 10 and 11 it will also be evident that a similar fuel transfer relationship occurs slightly more than 180 rotational degrees later in respect to the lower transfer port 186 (FIG. 10) and the lower combustion and compression chambers, within a few rotational degrees following exhaust of the lower combustion chamber through the lower housing exhaust port 194 (FIG. 11).

From a comparison of FIGS. 6A, 6B, 8 and 10 it will be apparent that the outlet valving port 180 of the compression rotor 172 is angularly or rotationally aligned with the inlet valving port 198 of the output rotor 24" to facilitate transfer of alternate charges of fuel-air mixtures from the compression chambers into the combustion chambers respectively immediately following alternate exhaust of the latter.

Thus, in operation of the engine 20", and referring to FIGS. 5–11 including particularly FIGS. 5 and 8B, a fresh charge of combustion mixture is inducted through the lower inlet manifold 176 (arrow 200), lower inlet port 174, and inlet valving aperture 138" of the pressure rotor 172 to fill the lower compression chamber of the compression compartment 170. At this time a similar charge of combustion mixture previously and alternately inducted through the upper inlet manifold 176 has been fully compressed in the upper compression chamber of the housing compartment 170 (FIGS. 5 and 8). A small rotational increment of the rotors 172, 24" brings the outlet valving aperture 180 of the compression rotor 172 and the inlet valving aperture 198 of the output rotor 24" into coincidence with the upper transfer port 184 as better shown in FIG. 8B. The fully compressed combustion mixture then flows immediately (arrow 202) through the associated housing protuberance 188, the compression rotor outlet port 180, the upper housing transfer port 184, the output rotor inlet port 198, and into the upper combustion chamber of the housing compartment 168, which combustion chamber has just been exhausted in the manner described previously. Thereafter, the output rotor 24" moves through a "compression stroke" of about 180° at which time the then further compressed combustion mixture is ignited in the upper combustion chamber by the spark plug 46"a. During this "compression stroke" and the resulting "power stroke" of the output rotor 24" its valve plates 30", 32" essentially seal the upper transfer port 184 and the upper exhaust port 192 of the engine housing 164. Thereafter, the exhaust sequence with respect to the upper combustion chamber is repeated with coincidence of the output rotor outlet port 196 and the upper housing exhaust port 192 followed by immediate coincidence of the output rotor inlet port 198 and the upper housing transfer port 184 (FIG. 8B).

A similar cyclic intake-compression-ignition-power-stroke-exhaust cycle occurs with respect to the lower combustion chamber of the engine housing compartment 168, as a fresh charge of uncompressed combustion mixture is inducted through the upper manifold 176 (arrow 204) into the upper compression chamber of the engine housing compartment 170, which at that time is substantially fully expanded (not shown). Also at that time a precompressed charge of combustion mixture is transferred from the lower compression chamber through the outlet valving port 180 of the compression rotor 172, the lower housing transfer port 186, the inlet valving aperture 198 of the output rotor 24", and into the lower combustion chamber of the housing compartment 168. As these cyclic operations occur, the two compression chambers of the housing intake compartment 170 (in the illustrated embodiment) and the two combustion chambers of the housing output compartment 168 are separated and sealed by the cyclically operating separator mechanisms 116", 26" respectively, in the manner described previously in connection with FIGS. 1–4 of the drawings. It will be understood of course that the alternative separator mechanisms of FIGS. 4B, 4C and 4D of the drawings or equivalents can be substituted for the separator mechanisms 26", 116" of FIGS. 5–11.

It will be apparent from the foregoing, as in the case of the engine 20 of FIGS. 1–4, that the engine 20" can be employed as a two stage pump if power is applied to the shaft 28". In the latter arrangement of the invention the spark plugs would, of course, be omitted.

From the foregoing it will be seen that novel and efficient forms of a rotary internal combustion engine have been described herein. The descriptive and illustrative materials employed herein are utilized for purposes of exemplifying the invention and not in limitation thereof. Accordingly, numerous modifications of the invention will occur to those skilled in the art without departing from the spirit and scope of the invention. Moreover, it is to be understood that certain features of the invention can be used to advantage without a corresponding use of other features thereof.

I claim:

1. A rotary internal combustion engine comprising a casing, a rotor mounted for eccentric rotation within said casing, separator means engaging said rotor for dividing said casing in cooperation with said rotor into at least two chambers, said casing having a number of intake and exhaust ports, a valve member secured to said rotor for rotation therewith and having a valve opening therein positioned for successive juxtaposition to said casing ports, said casing having wall channel means in substantially diametrically opposed relationship, said separator means including a pair of separator members slidably mounted in said wall channel means, the outward ends of said separator members being connected rigidly through a yoke structure to maintain a predetermined spaced relation therebetween, an output shaft extending through said casing, said rotor being eccentrically mounted on said shaft, and means coupled to said shaft for reciprocating said yoke structure, said reciprocating means including an eccentric member affixed to said shaft and having a phasal relationship to said rotor such that the inward end portions of said separator members are maintained in engagement with adjacent surfaces respectively of said rotor without substantial bearing contact therewith but with sufficient contact to prevent passage of fluid material.

2. A rotary internal combustion engine comprising a casing, a rotor mounted for eccentric rotation within said casing, separator means engaging said rotor for dividing said casing in cooperation with said rotor into at least two chambers, said casing having a number of intake and exhaust ports, a valve member secured to said rotor for rotation therewith and having valve opening means therein positioned for successive juxtaposition to said casing ports, said casing having wall channel means in substantially diametrically opposed relationship, said separator means including a pair of separator members slidably mounted in said wall channel means, and inward end portions of said separator members each being provided with anti-frictional sealing means for engaging respectively adjacent surfaces of said rotor, said separator member end portions and said sealing means being shaped to span geometric center positions of said rotor and an eccentric center of rotation thereof irrespective of the angular position of said rotor.

3. A rotary internal combustion engine comprising a casing, a rotor mounted for eccentric rotation within said casing, separator means engaging said rotor for dividing said casing in cooperation with said rotor into at least two chambers, said casing having a number of intake and exhaust ports, a valve member secured to said rotor for rotation therewith and having a valve opening therein positioned for successive juxtaposition to said casing ports, said casing having wall channel means in substantially diametrically opposed relationship, said separator means including a pair of separator members slidably mounted in said wall channel means, and inward end portions of said separator members each being provided with anti-frictional sealing means for engaging respectively adjacent surfaces of said rotor, said anti-frictional sealing means including a plurality of roller bearings encapsulated in an inward end face of each of said separator members, each of said roller bearings being positioned for rolling engagement with said rotor during at least a portion of the angular displacement thereof.

4. The combination according to claim 3 wherein said valve members includes a pair of valve plates mounted on opposite sides of said rotor respectively, said separator member end faces being inserted generally between said valve plates so that said roller bearings are longitudinally restrained therebetween during at least the major proportion of the angular displacement of said rotor.

5. A rotary internal combustion engine comprising a housing, a rotor mounted for eccentric rotation within said housing, separator members slidably mounted on said housing and engaging said rotor for dividing said housing in cooperation with said rotor into at least two chambers, said housing having a number of intake and exhaust ports, a valve member secured to said rotor for rotation therewith and having a valve opening therein positioned for successive juxtaposition to said housing ports, said rotor being mounted on a shaft extending from said housing and into a second housing, a pump member positioned said second housing and secured to said shaft for rotation therewith, conduit means for connecting a source of fuel-air mixture to said second housing, additional conduit means for connecting the output of said second housing to the intake ports of the first-mentioned housing, cooperative means coupled to said pump member and to said second housing for pulsing the output of said second housing and said pump member, said pump member and said rotor being secured to said shaft in a phasal relationship such that the output pulses of said second housing are delivered to the intake port means of the first-mentioned housing only when said valve member opening is juxtaposed thereto, said pump member being an eccentric rotor, second separator members similarly slidably mounted on said second housing for transverse contact with said pump rotor, outward end portions of the first-mentioned separator members and of said second separator members being rigidly interconnected through yoke structures, and means coupled to said shaft for reciprocating said yoke structures and said separator members.

6. A rotary internal combustion engine comprising a housing, a rotor eccentrically mounted for rotation within said housing, separator means for dividing said housing in cooperation with said rotor into at least two chambers, said housing having intake and exhaust ports for each of said chambers, said housing having wall channel means in substantially diametrically opposed relationship, said separator means including a pair of separator members positioned for opposed substantially diametric engagement with said rotor and slidably mounted in said housing channel means, outward end portions of said separator members extending outwardly of said housing channel means and rigidly joined to a yoke structure, an output shaft rotatably mounted on said housing, said rotor being eccentrically mounted on said shaft, and means coupled to said shaft in engagement with said yoke structure for reciprocation thereof, said reciprocation means including an eccentric member affixed to said shaft and having an angular phasal relationship with said rotor such that said separator members are reciprocated in substantially non-bearing but sealing contact with said rotor.

7. A rotary internal combustion engine comprising a housing, a rotor eccentrically mounted for rotation within said housing, separator means for dividing said housing in cooperation with said rotor into at least two chambers, said housing having intake and exhaust ports for each of said chambers, said housing having wall channel means in substantially diametrically opposed relationship, said separator means including a pair of separator members positioned for opposed substantially diametric engagement with said rotor and slidably mounted in said wall channel means, outward end portions of said separator members extending outwardly of said housing channel means and joined to a yoke structure, an output shaft rotatably mounted on said housing, said rotor being eccentrically mounted on said shaft, and eccentric means coupled to said shaft in engagement with said yoke structure for reciprocation thereof, said eccentric means having an angular phasal relationship with said rotor such that said separator members are reciprocated in substantially non-bearing contact with said rotor, inward faces of said separator members each being provided with anti-frictional sealing means for contacting said rotor, said sealing means spanning geometric and eccentric centers of said rotor in a direction transverse to that of the sliding movement of said separator members.

8. A rotary pump for delivering a pulsating flow, said pump comprising a housing, a rotor eccentrically mounted for rotation within said housing, separator means mounted on said housing for engagement with said rotor for dividing said housing into at least two chambers in cooperation with said rotor, said housing having inlet and outlet ports for each of said chambers, a valve member mounted on said rotor for rotation therewith, said valve member having inlet and outlet openings positioned thereon for engagement respectively with said housing inlet and outlet ports, said separator means including a pair of separator members slidably mounted on said housing for substantially diametric engagement with said rotor, and sealing means mounted on inward faces of said separator members for engagement with said rotor, said sealing means spanning the eccentric rotational and the geometric centers of said rotor during revolution thereof.

9. A rotary pump for delivering a pulsating flow, said pump comprising a housing, a rotor eccentrically mounted for rotation within said housing, separator means mounted on said housing for engagement with said rotor for dividing said housing into at least two chambers in cooperation with said rotor, said housing having inlet and outlet ports for each of said chambers, a valve member mounted on said rotor for rotation therewith, said valve member having inlet and outlet openings positioned thereon for engagement respectively with said housing inlet and outlet ports, outward end portions of said separator members protruding outwardly of said housing, a rigid yoke structure rigidly secured to said outward end portions of said separator members, a shaft rotatably mounted in said housing, said rotor being eccentrically mounted on said shaft, means coupled to said shaft for reciprocating said yoke structure, said reciprocating means including an eccentric member affixed to said shaft and positioned in phasal relationship to said rotor such that said separator members are reciprocated in substantially non-bearing but sealing contact with said rotor.

10. A rotary internal combustion engine comprising a first housing, a combustion rotor mounted for eccentric rotation within said first housing, said first housing having a number of intake and exhaust ports, a valve member secured to said rotor for rotation therewith and having valve opening means therein positioned for successive juxtaposition to said first housing ports, said combustion rotor being eccentrically mounted on a shaft extending from said first housing and into a second housing, a pump rotor mounted for eccentric rotation within said second housing and eccentrically secured to said shaft for rotation therewith, conduit means for connecting a source of fuel-air mixture to said second housing, additional conduit means for connecting the output of said second housing to the intake ports of said first housing, cooperative means coupled to said pump rotor and to said second housing for pulsing the output of said second housing and said pump rotor, said pump rotor and said combustion rotor being secured to said shaft in a phasal relationship such that the output pulses of said second housing are delivered to the intake port means of said first housing only when said valve member opening means are juxtaposed thereto, and separator members slidably mounted on each of said first and said second housings for dividing each of said housings in cooperation with the respectively associated rotors into at least two chambers, each of said separator members having a portion disposed for contacting the associated rotor, each of said contacting portions having a width equal to at least twice the distance between the geometric and eccentric centers of the associated rotor for spanning said centers during revolution of the associated rotor.

11. The combination according to claim 10 wherein said second housing has intake and outlet ports juxtaposed to each of said chambers, and a valve member is mounted on said pump rotor for rotation therewith and having opening means therein juxtaposable to said second housing ports respectively.

12. The combination according to claim 10 wherein said first and second housings are compartments in a common engine housing, said engine housing having a partition therethrough and separating said first and said second housings, said housing partition including at least two transfer ports positioned for successive juxtaposition thereto by said valve member opening means.

13. The combination according to claim 12 wherein said pump rotor is provided with a valve member having an outlet valving port therein positioned for successive juxtaposition to said transfer ports.

14. The combination according to claim 13 wherein said valve member opening means and said valving port are positioned for simultaneous juxtaposition to a given one of said transfer ports.

15. The combination according to claim 12 wherein said housings and said partition therebetween and said rotors are generally circular in configuration.

16. The combination according to claim 15 wherein each of said eccentric rotors is provided with a pair of valving plates secured respectively thereto but mounted concentrically on said shaft.

17. A rotary internal combustion engine comprising a first housing and a second housing, a shaft extending from said first housing into said second housing, a combustion rotor and a pump rotor mounted for eccentric rotation within said first and said second housings respectively and eccentrically secured to said shaft for rotation therewith, separator members slidably mounted on each of said first and said second housings for dividing each of said housings in cooperation with the respectively associated rotors into at least two chambers, conduit means for coupling a source of fuel-air mixture to one of said housings and for coupling the output of the one housing to the intake of the other housing, said housings being separated by a partition extending therebetween, said partition having transfer port means coupled to said conduit means, one of said rotors being provided with a concentric valve member of generally circular configuration, one of said housings being of smaller dimension that that of the other of said housings and being positioned generally concentrically thereof, said smaller housing having a peripheral flange whereby it is joined to said other housing adjacent said partition, said flange and said partition being shaped to define a peripheral groove lying generally between said partition and said flange into which groove said concentric valve member is seated for sealed rotation.

18. The combination according to claim 17 wherein said smaller housing is provided with hollow protuberance means juxtaposed respectively to the transfer port means of said partition and communicating with said peripheral groove to facilitate the transfer of fluid therethrough between said second housing and said first housing.

* * * * *